May 29, 1962    G. B. CANADA, SR    3,036,397
COMBINED FISHHOOK RETRIEVER AND FLOAT
Filed Sept. 8, 1958
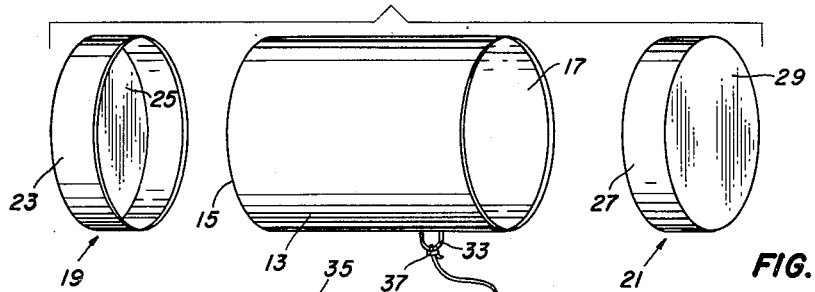
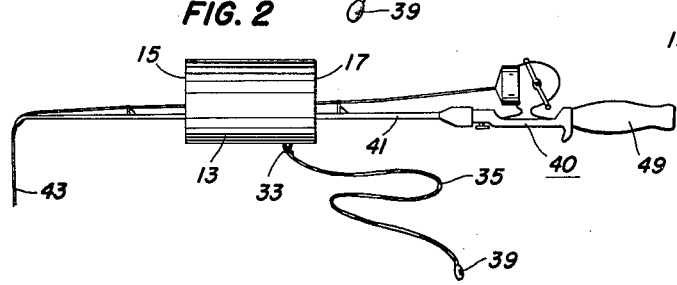
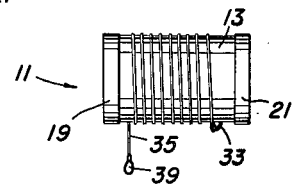
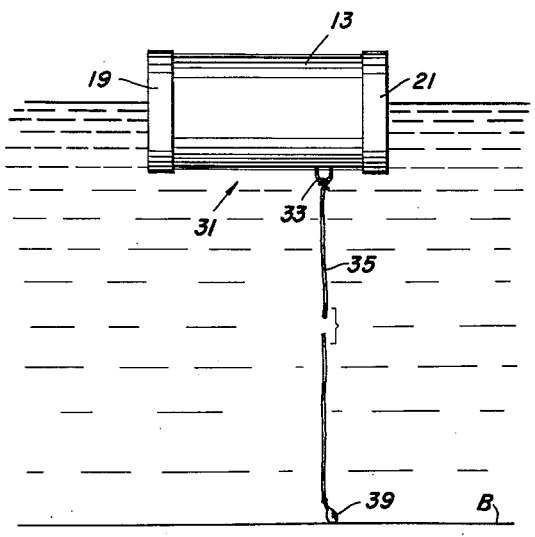
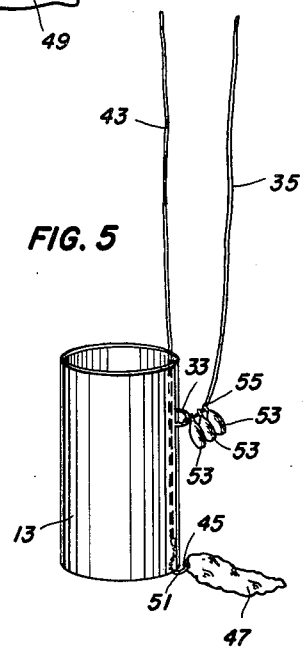
INVENTOR.
GEORGE B. CANADA, SR.
BY John R. Walker, III
Attorney

3,036,397
COMBINED FISHHOOK RETRIEVER AND FLOAT
George B. Canada, Sr., 25 S. McLean Blvd., Apt. 16, Memphis, Tenn.
Filed Sept. 8, 1958, Ser. No. 759,815
3 Claims. (Cl. 43—17.2)

This invention relates to a device for the aid of fishermen, which invention is adapted to be used as a fishhook retriever or float.

One of the objects of the present invention is to provide a handy, compact, convenient, and useful device for fishermen, which device is a combined fishhook retriever and spotter or float.

A further object is to provide a simple and inexpensive device and, yet, one which is exceedingly effective.

A further object is to provide such a device comprising a cylindrical body member having open opposite ends, a pair of caps respectively fitted on opposite ends of said body member to form a water-tight float, a drop line attached to said float and adapted to be wound therearound, and a weight attached to said drop line adjacent the end thereof remote from the attached end whereby the device is adapted to be tossed into the water at a spot desired to be marked by the fisherman whereupon the weight causes unwinding of the drop line which acts as an anchor for the float.

A further object is to provide such a device in which said caps are removable whereby the device is adapted to be used as a retriever for fishhooks by passing said body member over the fishing gear and down the fishing line into the bight of the fishhook whereupon the body member may be joggled by the drop line to release the fishhook.

A further object is generally to improve the design and construction of devices for use as fishhook retrievers and spotters.

Other objects and advantages reside in the details of construction and operation as more fully hereinafter described and claimed, reference being had to the accompanying drawings forming part hereof, in which:

FIG. 1 is an exploded view on an enlarged scale of the device of the present invention.

FIG. 2 is a side elevational view on a reduced scale of the device with the end caps removed and shown being passed over the fishing gear in preparation for retrieving the fishhook.

FIG. 3 is a side elevational view on the scale of FIG. 2 of the device with the end caps in place and with the drop line wound around the body of the float in preparation for being tossed into the water.

FIG. 4 is a side elevational view of the device after being tossed into the water.

FIG. 5 is a perspective view of the device being used as a fishhook retriever.

Referring now to the drawings in detail in which the various parts are indicated by reference characters, the device of the present invention, which is indicated by the numeral 11, comprises in general a hollow and substantially cylindrical body member 13 having open opposite ends 15, 17 and being open from end to end thereof whereby being adapted to be passed over the complete fishing gear as best shown in FIG. 2. The device 11 additionally comprises a pair of end caps 19, 21. End cap 19 includes a cylindrical portion 23 and a disc 25 integrally formed adjacent one end of the cylindrical portion. End cap 21 is similarly formed and comprises a cylindrical portion 27 and a disc 29 integrally formed adjacent one end of cylindrical portion 27. The relative inside diameters of cylindrical portions 23, 27 and the outside diameter of body member 13 are such that the caps 19, 21 will slidably and tightly fit over the opposite ends 15, 17 to close the ends and form a water-tight float designated in general by the numeral 31.

An eyelet 33 is fixedly mounted on the exterior of body member 13 intermediate the ends thereof and extending outwardly therefrom. A drop line 35 is attached to float 31 as by tying the end of the drop line to eyelet 33 as at 37. Drop line 35 is weighted as by a weight 39 being fixedly attached adjacent the end of drop line 35 which is remote from the end attached to eyelet 33.

In preparation for the use of the device 11 as a float or spotter, end caps 19, 21 are placed on body member 13 as heretofore described and drop line 35 is wound about body member 13 as best shown in FIG. 3. When the fisherman desires to mark a particular spot in the water—as, for example, a good fishing spot to which he wants to return—he simply tosses the device 11 with the drop line 35 wound therearound, as above described, into the water whereupon the weight 39 will cause body member 13 to rotate and unwind the drop line so that the drop line depends from float 31 and the float 31 floats adjacent the surface of the water as best shown in FIG. 4 to mark the spot desired by the fisherman. Drop line 35 is preferably of such length that weight 39 will rest on the bottom B of the lake, river, or the like to act as an anchor for the float.

In preparation for using device 11 as a fishhook retriever, end caps 19, 21 are removed from body member 13. The device 11 is shown in the drawings in conjunction with fishing gear 40 which comprises the usual fishing rod 41 having a fishing line 43 and having a fishhook 45 attached to the lower end of the fishing line. The upper portion of fishing gear 40 is best shown in FIG. 2 and the lower portion thereof is best shown in FIG. 5. For the purposes of explanation, fishhook 45 is shown in FIG. 5 as being caught on an object as a snag or the like, which object is designated by the numeral 47. The inside diameter of body member 13 is greater than the largest diameter of fishing gear 40 whereby when the fisherman has caught his hook as above described the body member may be passed over the fishing rod from the handle end 49 thereof with the body member encircling the fishing gear. Then, body member 13 is lowered by the aid of drop line 35 down the fishing line 43 until the body member reaches fishhook 45, as best shown in FIG. 5. In other words, the fisherman, upon finding that his fishhook is caught, will stick the handle end of his fishing rod through body member 13 and then slide the body member downward along the fishing line as above described. The fact that the body member 13 is large enough to pass over the fishing gear permits simplicity of construction in that only a simple cylindrical body member is necessary without any complicated means for placing the device in position to encircle the fishing line. Additionally, the line need not be broken to thread the line through the device. Once the body member 13 is in position adjacent fishhook 45 with the lower end of the body member resting in the bight 51 of the fishhook, the body member may be joggled back and forth and up and down by the fisherman's pulling on drop line 35 until the body member works the fishhook out of object 47. If the fishhook is embedded deeply, weights 53 of well-known construction, respectively having snap hooks 55, may be snapped on to drop line 35 and allowed to slide down the line until they reach eyelet 33 as best shown in FIG. 5. This additional weight provides a greater force of body member 13 on fishhook 45 whereby making it easier to free the fishhook.

From the foregoing description it will be understood that a handy, compact, convenient, and useful device for fishermen is provided, which device is adaptable for the dual purpose of a spotter and a fishhook retriever.

Although the invention has been described and illustrated with respect to a preferred embodiment thereof, it is to be understood that it is not to be so limited since changes and modifications may be made therein which are within the full intended scope of this invention as hereinafter claimed.

I claim:

1. A device of the class described for use as a float and with fishing gear having a snagged fishhook, said device comprising a hollow cylindrical body member having open opposite ends, a pair of caps respectively fitted on opposite ends of said body member to form a water-tight float, an eyelet fixedly mounted on said body member intermediate the ends thereof, a drop line having one end thereof attached to said eyelet and being adapted to be wound around said body member, a weight attached to said drop line adjacent the end thereof remote from the attached end thereof whereby the device is adapted to be tossed into the water so that the weight will cause unwinding of said line, said caps being removable from said body member and the inside diameter of said cylindrical body member being greater than the largest diameter of said fishing gear whereby said body member is adapted to be passed over the fishing gear to encircle the fishing line thereof and rest in the bight of said fishhook so that the fishhook may be retrieved by the aid of said drop line.

2. A device of the class described for use as a float and with fishing gear having a snagged fishhook, said device comprising a hollow cylindrical body member having open opposite ends, a pair of caps respectively fitted on opposite ends of said body member to form a water-tight float, a drop line having one end thereof coupled to said float and being adapted to be wound therearound, a weight attached to said drop line adjacent the end thereof remote from the end thereof coupled to said float whereby the device is adapted to be tossed into the water so that the weight will cause unwinding of said line, said caps being removable from said body member and the inside diameter of said cylindrical body member being greater than the largest diameter of said fishing gear whereby said body member is adapted to be passed over the fishing gear to encircle the fishing line thereof and rest in the bight of said fishhook so that the fishhook may be retrieved by the aid of said drop line.

3. A device of the class described for use as a float and with fishing gear having a snagged fishhook, said device comprising a hollow substantially rigid body member having open opposite ends, a pair of caps respectively slidably fitted on opposite ends of said body member to form a water-tight float, a weighted drop line having one end thereof coupled to said float, said caps being removable from said body member and the inside diameter of said cylindrical body member being greater than the largest diameter of said fishing gear whereby said body member is adapted to be passed over the fishing gear to encircle the fishing line thereof and rest in the bight of said fishhook so that the fishhook may be retrieved by the aid of said drop line.

References Cited in the file of this patent

UNITED STATES PATENTS

| 664,070 | Wiley | Dec. 18, 1900 |
| 1,993,974 | McVicker | Mar. 12, 1935 |
| 2,536,414 | Beard | Jan. 2, 1951 |
| 2,779,120 | Moore | Jan. 29, 1957 |
| 2,787,078 | Aliber | Apr. 2, 1957 |

FOREIGN PATENTS

| 487,753 | France | Apr. 30, 1918 |
| 779,271 | France | Jan. 14, 1935 |
| 970,493 | France | June 21, 1950 |